United States Patent [19]

Tipon et al.

[11] Patent Number: 5,150,471
[45] Date of Patent: Sep. 22, 1992

[54] METHOD AND APPARATUS FOR OFFSET REGISTER ADDRESS ACCESSING

[75] Inventors: Donald G. Tipon, San Diego; Jan P. Stubbs, Leucadia, both of Calif.

[73] Assignee: NCR Corporation, Dayton, Ohio

[21] Appl. No.: 341,081

[22] Filed: Apr. 20, 1989

[51] Int. Cl.[5] .................... G06F 9/26; G06F 12/02
[52] U.S. Cl. .................... 395/400; 395/375; 364/DIG. 1; 364/DIG. 2; 364/255.5
[58] Field of Search ... 364/200 MS File, 900 MS File

[56] References Cited

U.S. PATENT DOCUMENTS

| | | | |
|---|---|---|---|
| 3,693,165 | 9/1972 | Reiley et al. | 340/172.5 |
| 3,761,881 | 9/1973 | Anderson et al. | 340/172.5 |
| 4,068,303 | 1/1978 | Morita | 364/200 |
| 4,398,245 | 8/1983 | Fujita | 364/200 |
| 4,520,441 | 5/1985 | Bandoh et al. | 364/200 |
| 4,527,232 | 7/1985 | Bechtolsheim | 364/200 |
| 4,538,223 | 8/1985 | Vahlstrom et al. | 364/200 |
| 4,550,368 | 10/1985 | Bechtolsheim | 364/200 |
| 4,613,953 | 9/1986 | Bush et al. | 364/900 |
| 4,616,311 | 10/1986 | Sato | 364/200 |
| 4,722,047 | 1/1988 | Chan et al. | 364/200 |
| 4,796,177 | 1/1989 | Nishimura et al. | 364/200 |
| 4,811,206 | 3/1989 | Johnson | 364/200 |
| 4,811,215 | 3/1989 | Smith | 364/200 |
| 4,908,748 | 3/1990 | Pathak et al. | 364/200 |
| 5,043,868 | 8/1991 | Kitamura et al. | 364/200 |
| 5,045,993 | 9/1991 | Murakami et al. | 364/200 |

Primary Examiner—Stuart N. Hecker
Assistant Examiner—Michael A. Whitfield
Attorney, Agent, or Firm—Jack R. Penrod

[57] ABSTRACT

In a pipeline data processing system, a method for additively converting an address expressed in offset form to a corresponding real address in main memory (assuming that such address exists in main memory). Because of the pipeline data processing design, this offset address can be accessed from main memory in the same amount of time required by a non-offset, real address. An apparatus for practicing this method is also provided. This method and apparatus will perform the functions usually performed by a translation table or similar device in virtual memory systems. Furthermore, it will perform those functions faster and will utilize a smaller integrated circuit area than translation table type virtual memory systems.

7 Claims, 3 Drawing Sheets

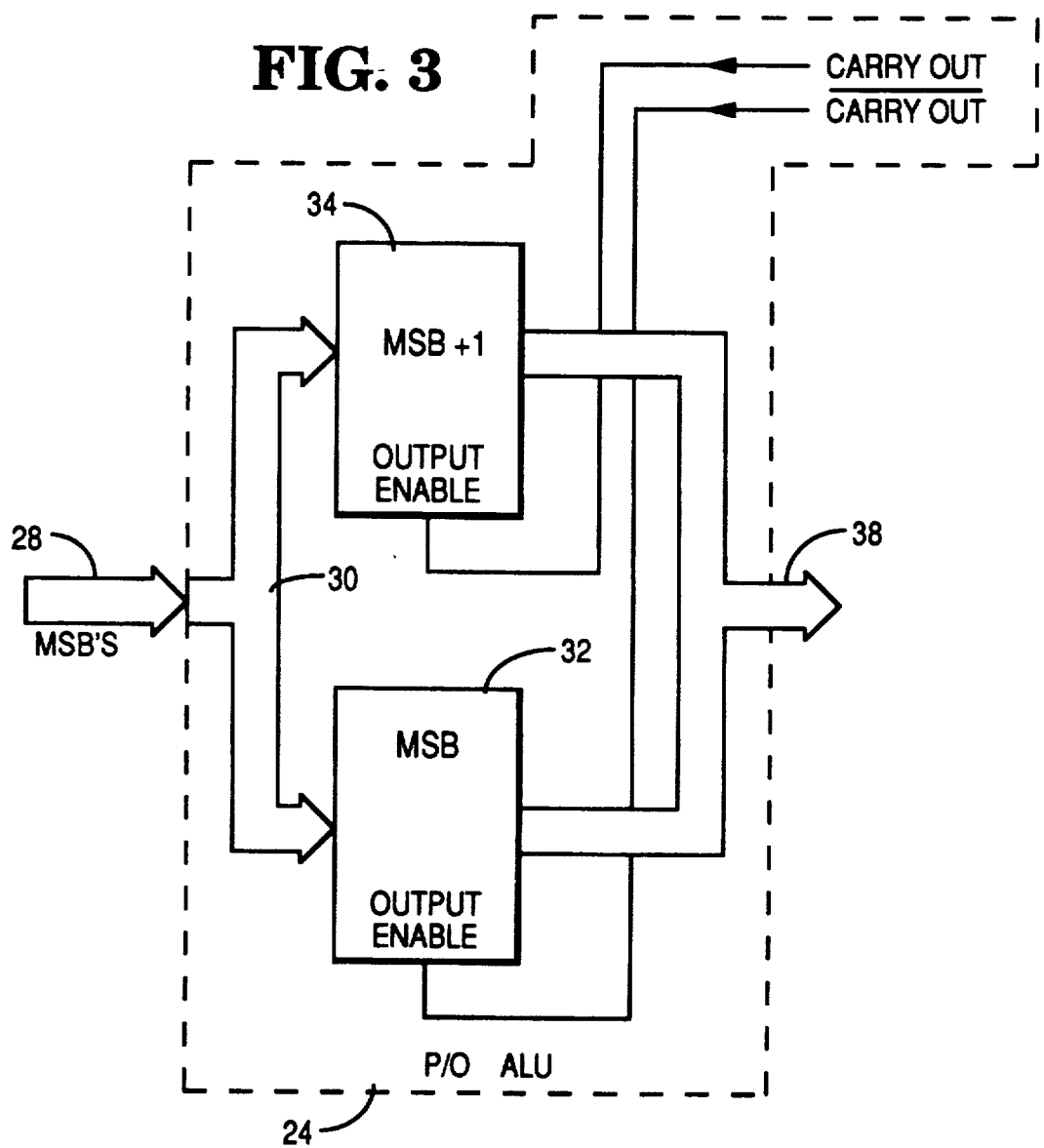

METHOD AND APPARATUS FOR OFFSET REGISTER ADDRESS ACCESSING

BACKGROUND OF THE INVENTION

The present invention relates to a virtual memory computer system and more particularly to a method and apparatus for providing access to a virtual address whose data is currently located in main memory. The present invention can access the virtually addressed data which is currently located in main memory in the same amount of time that is required to access a real address.

The cost of memory hardware practically limits the amount of semiconductor RAM that can be used in a data processing system. However, data processing system users continue to demand greater memory capabilities from their systems than can be supported by the practical amount of semiconductor RAM. This user demand for greater capabilities has made virtual memory computer systems very popular. Such systems make the relatively inexpensive storage space of a disk or similar mass storage device appear to the rest of the system to be a very large semiconductor RAM address space. Accesses to the virtual memory addresses are processed by the operating system such that they are 'transparent' to the user. Thus, virtual memory systems provide a user friendly supplement to the semiconductor RAM main memory in a data processing system.

In known data processing systems, the advantages in cost and user friendliness of virtual systems must, however, be balanced against the typically considerable disadvantage in processing speed experienced during a virtual memory address access. A good discussion of the access problem of known virtual systems is found in U.S. Pat. No. 4,737,909 issued Apr. 12, 1988 to Harada entitled CACHE MEMORY ADDRESS APPARATUS, which is hereby incorporated by reference. In these known systems, extra processing cycles are added to each virtual memory access which requires the translation of a virtual memory address into a real memory address in order for further processing to take place. These known systems all use the common solution of storing the previously translated virtual addresses and their respective real addresses in a large lookup table. Such an approach does not save processing time the first time each virtual address therein is translated to a corresponding real address, but it does save processing time on subsequent accesses to any virtual address already in the table, as long as the lookup time is less than the translation time.

The translation delay and the lookup delay of a lookup table provide major speed disadvantages in RISC and similar systems, where the goal is to perform each instruction in one machine cycle. This is especially true if the system is performing an access to a virtual memory address using a variable offset from a fixed memory location. In the offset addressing mode, which is a common one, the offset value, which is contained in the offset address instruction, must be added to a base address in order to obtain a virtual address, and subsequently the virtual address must be translated to a real address. In such a mode, the known virtual systems would take the time to add the offset to the base address and then take more time to do either a translation or a lookup of the virtual address. The cumulative time delay produced in any of the known systems would be very undesirable in a RISC or similar system. Moreover, if the system were a pipelined system, as most RISC systems are, the pipeline would be held up for the completion of each translation/lookup of a virtual memory address, thereby reducing the advantages of a pipeline data processing system.

It is an object of the present invention to provide a virtual memory address system that divides the conversion of a virtual address to a real address into a number of operations and subsequently processes these operations in parallel to increase processing speed.

It is another object of this invention to provide a pipelined virtual memory system that converts a virtual address to a real address in operations which are performed in parallel with the advancing of the pipeline stages, in order to speed up virtual accesses.

It is further object of this invention to provide a pipelined system for offset addressing to a virtual address wherein the conversion to a real address is processed in parallel with the advancing of the pipeline stages in order to speed up offset accesses.

SUMMARY OF THE INVENTION

Briefly stated, in accordance with one aspect of the invention, the foregoing objects are achieved by providing an apparatus for addressing memory address locations using variable offsets from preselected memory address locations, including a register for storing each preselected memory address by a data processor, a device for transferring an offset value from an offset data field of a most recently fetched instruction from the data processor, a device for adding the offset value to the current preselected memory address and outputting an interim memory address via this addition, a device for determining if the most recently fetched instruction is an offset memory access instruction or not, and a device for finalizing the interim memory address into a final memory address if the most recently fetched instruction is indeed an offset memory instruction.

In accordance with another aspect of the invention, the aforementioned objects are achieved by a method for addressing memory address locations using variable offsets from preselected memory address locations, including the steps of preloading a preselected memory address into a first register, transferring an offset value from an offset data field of a most recently fetched instruction, adding the offset value to the preselected memory address and generating an interim memory address via this addition, determining if the most recently fetched instruction is an offset memory access instruction, and finalizing the interim memory address into a final memory address if the most recently fetched instruction is an offset memory instruction.

Various objects appear from a reading of the foregoing brief summary of the invention and other objects and further scope of applicability of the present invention will appear from the following detailed description. It should be understood that the detailed description indicates one embodiment of the invention and is given by way of illustration only since changes and modifications may be made within the spirit and scope of the invention.

BRIEF DESCRIPTION OF THE DRAWINGS

While the specification concludes with the appended claims particularly pointing out and distinctly claiming the subject matter which is regarded as the invention, it is believed that the invention will be better understood from the following description of the illustrative embodiment taken in conjunction with the accompanying drawings in which:

FIG. 3 is a block diagram of an embodiment of the most significant portion of an ALU according to the invention.

DETAILED DESCRIPTION OF A PREFERRED EMBODIMENT

Figure 1:
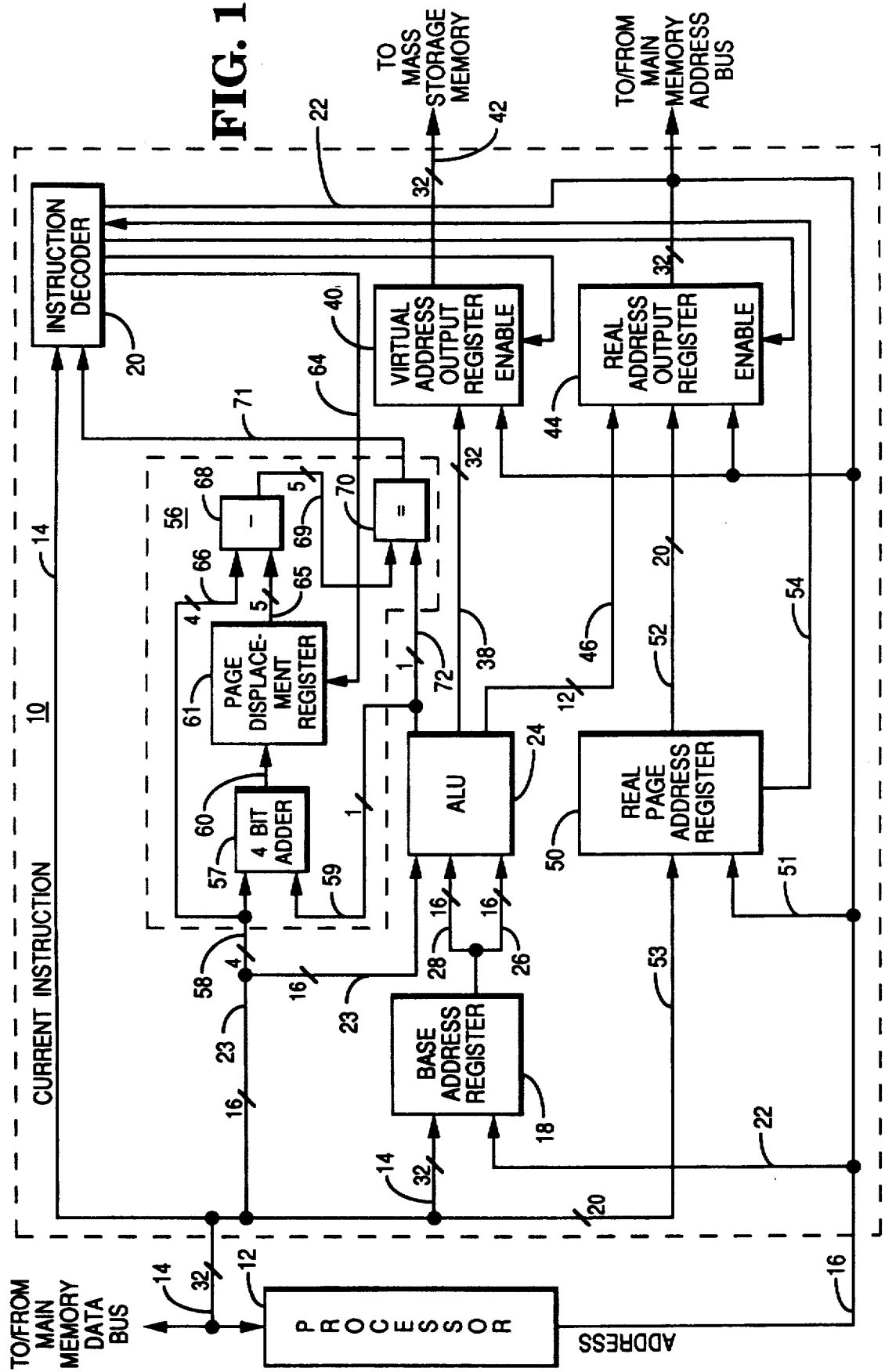
FIG. 1 is a block diagram of an embodiment of the invention.

Referring to FIG. 1, there is shown a block diagram of an embodiment of the offset addressing unit 10 in accordance with one embodiment of the present invention. The offset addressing unit 10 is connected to a processor 12 by a 32 bit data and instruction bus 14, and a 32 bit address bus 16. A 32 bit base address register 18 is connected to the processor 12 by the data and instruction bus 14 and the address bus 16. The base address register 18 is loaded by the processor 12 with a preselected, 32 bit base address over the data and instruction bus 14 under the control of the processor 12 via the address bus 16. The loading of each preselected base address, in turn, is performed according to a predetermined computer program a few cycles before the occurrence of an offset address access instruction. Movement of information out of the base address register 18 is controlled by an instruction decoder 20 across lines 22, as will be explained below.

In the preferred embodiment, the processor 12 operates a system having a three stage pipeline, including a fetch stage, an interpret stage and an execute stage for each instruction. With minor variations, the method and apparatus are applicable to other embodiments as well, so the invention is not limited to this illustrative embodiment. In a manner well known in the art, the execution of the instruction currently in the execution stage of the pipeline partly overlaps the interpretation of a second instruction currently in the interpret stage of the pipeline, as well as the fetching of a third instruction currently in the fetch stage of the pipeline. The program for the processor 12 is stored in part of the main memory (not shown) and is accessed by the address bus 16 and the data and instruction bus 14 in any of a number of ways known in the art.

Figure 2:
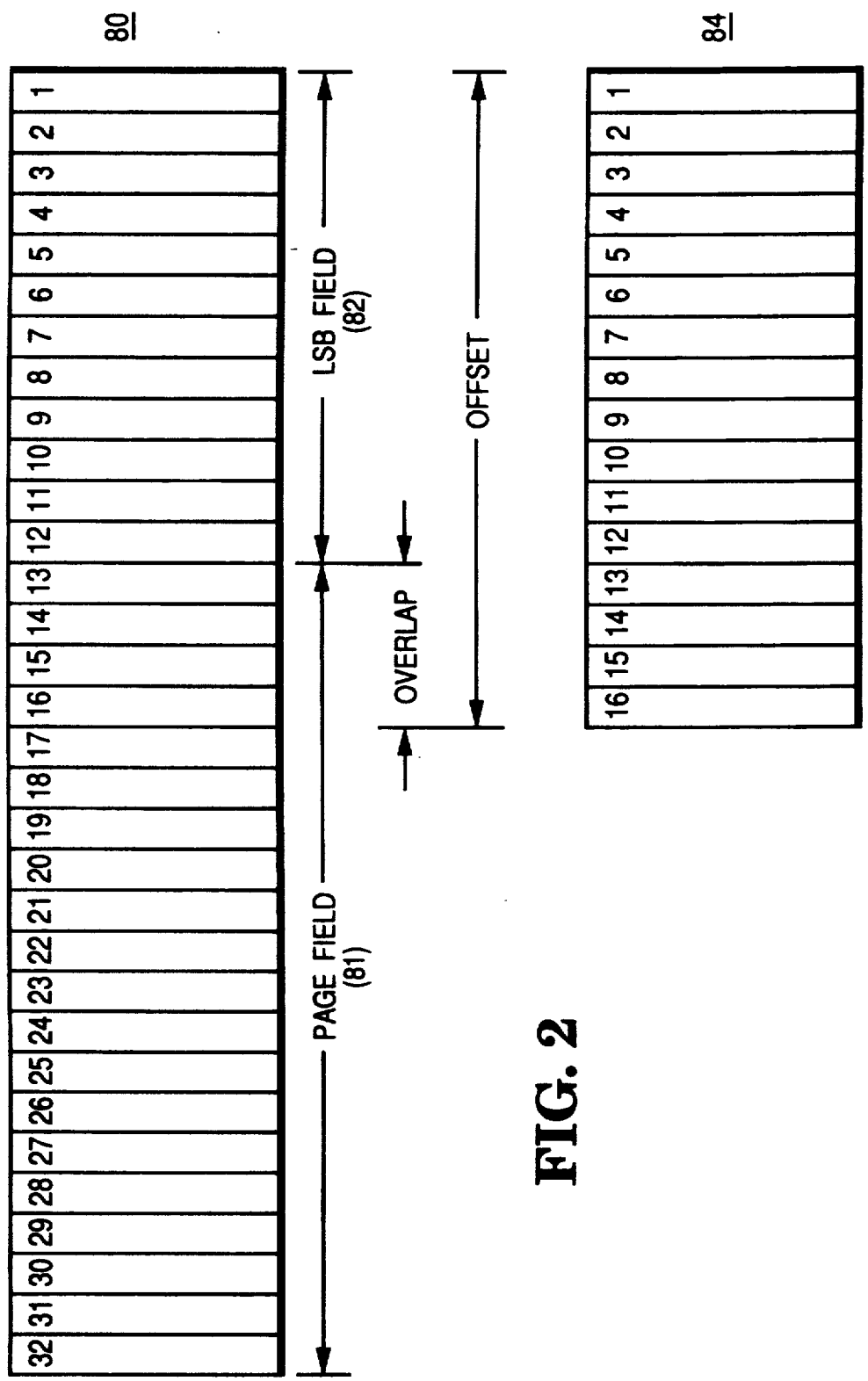
FIG. 2 a block diagram of the data structures used in the embodiment shown in FIG. 1.

When an instruction is fetched which may be an offset address access instruction, the fetched instruction is separated into its three information fields: an operation code (opcode), an offset register address, and an offset. As shown in FIG. 2, the offset 84 in the preferred embodiment has a 16 bit binary field that is right indexed, that is, it is located in the 16 least significant bit positions.

Referring again to FIG. 1, the offset data is transferred over a sixteen line bus 23 to an arithmetic logic unit (ALU) 24 to a first group of inputs, which correspond to the 16 least significant bit positions of the ALU 24. The opcode field is connected to the processor 12, where it is used in interpreting the instruction, and to the instruction decoding unit 20 where the opcode is decoded to select a predetermined control/enable sequence which performs the offset address access, to either real or virtual memory, in parallel with the operation of the processor 12 in order to speed up such accesses.

The sixteen least significant bits of the base address register 18 are hard-wired by a sixteen line bus 26 to the ALU 24 to a second group of inputs, which also correspond to the sixteen least significant bit positions thereof. The sixteen most significant bits of the base address register 18 are, similarly, hard-wired, by a sixteen line bus 28, to the inputs which correspond to the sixteen most significant bit positions of the ALU 24. Since the base address register 18 and the ALU 24 are hard-wired, the 32 bit base address stored in the base address register 18 is conducted immediately after storage therein to the inputs of the ALU 24, and awaits there for the transferring of an offset 84 (shown in FIG. 2) so that the ALU 24 can subsequently add the two sets of least significant bits.

Since only the two groups of least significant bits are being added together, it can be demonstrated that only the corresponding least significant bit positions of the ALU 24 need to be full binary adders (i.e. adders having a carry-in input and a carry-out output). The most significant bits will not be changed from the value inputted via the bus 28 because of the addition of the offset to the least significant bits of the base address unless a carry into the lowest of the most significant bits is generated by the addition. Therefore, the logic of the most significant bit positions of the ALU 24 can be simplified.

One such simplification is shown in FIG. 3. The most significant bits supplied of the ALU 24 can only be changed by a carry out from the addition of the two least significant bit groups. Recognition of this allows the use of carry-look-ahead techniques to speed up the processing even further. FIG. 3 shows a simplified block diagram embodiment of the upper half of the ALU 24 using one of a number of possible carry-look-ahead techniques. In the embodiment of FIG. 3, the most significant bits of the base address are received over the bus 28 on an internal bus 30. These most significant bits are stored in registers 32, 34. The value stored in the register 34 has a binary one added to its lowest bit position and any carry is allowed to propagate until a more significant carry is no longer generated. If there is a carry out of the ALU 24 generated during the addition of the two least significant bit groups, the register 34 will contain the valid most significant bits of the offset address being accessed. If, on the other hand, the addition of the two least significant bit groups in the ALU 24 does not generate a carry out of its highest position, then the register 32 will contain the valid most significant bits of the offset address being accessed.

The embodiment shown in FIG. 3 when used with a full adder in the lower bit positions will provide the most significant bits of the memory address one delay time after the carry/carry-not determination out of the full adder circuitry of the lower bit positions is made. If a standard full adder lower portion is not fast enough for a given pipeline data processing system, any number of faster, but more complex, known carry-look-ahead techniques may be applied, which would produce the most significant bits of the address at the same time as the least significant bits are completed.

If, on the other hand, a smaller physical size is more important than a higher speed, a circuit having the most significant bits of the ALU 24 comprised of standard two input adders is the most compact. Each most significant bit adder of this compact alternative embodiment has one data input and one carry input.

These various methods and apparatus for processing an offset address access in parallel with the pipeline progression may save between two and five system clock cycles over the use of the processor 12 to perform the offset conversion, or the use of a translation lookup table.

Referring again to FIG. 1, the output of the ALU 24 is connected by output bus 38 to virtual address register 40. Thus, by the beginning of the execute stage of the pipeline, an offset addressing instruction has been translated to its virtual address value, and that value has been stored in virtual address register 40. Also by the beginning of the execute cycle, a determination has been made regarding the availability of the virtually addressed data as will be explained below. If the data page, corresponding to the left indexed twenty bit data field 81, shown in FIG. 2, that was accessed by the previous offset address access is different from the data page of the current offset address access, then the instruction decoder 20, see FIG. 1, will enable the output of the register 40 to output an address to a mass storage memory bus 42 in order to retrieve the addressed information from a disk or other mass storage device. This takes time, but as will be explained below, it doesn't occur often. Further, since this is directly analogous to a miss and a subsequent filling of a translation lookup table in known translation lookup table virtual systems, the time taken is at least as good as those systems.

The lowest bit positions of the address accessed by an offset address instruction are connected from the lowest output bit positions (the twelve lowest in the embodiment shown in FIG. 1) of the ALU 24 to a real address output register 44 by bus 46. The real address output register 44 further has a multi-bit input (twenty in the embodiment shown in FIG. 1) connected to a multi-bit output of a real page address register 50 by bus 52. Thus, the real address output register 44 contains a real memory address which is a concatenation of the twelve lowest bit positions supplied from the ALU 24 and the twenty page bits supplied from the real page address register 50. This concatenation, as the offset address translation, is likewise performed during the interpret stage of its respective instruction. The real address which results from the concatenation is an interim result, and is subject to validation according to the results from other portions of the offset register unit 10. If it is determined, as will be explained below, that the real address interim result in the register 44 is valid, then during the earliest possible part of the execute stage of this instruction, this real address will be transmitted over the system address bus 16.

A novel page displacement circuit 56 determines if the location addressed by the offset address access currently in the interpret stage of the pipeline is located on the same virtual page (or real page) as the previous offset address access. Instead of using a twenty or thirty-two bit comparator or similar device for comparing the last offset address accessed, i.e. the translated address stored in virtual address register 40, to the current translated address from an offset address access, the page displacement circuit only stores and compares the portions of the translated addresses which would indicate a difference at the page level. The page displacement circuit 56 has fewer electronic components and works more quickly than a twenty or thirty-two bit comparator, or similar device.

Referring to FIG. 2, a thirty-two bit address 80 is shown, which is the length of the address words stored in the virtual address register 40 shown in FIG. 1. Bits thirteen through thirty-two define a page field 81, which can identify either a virtual or a real page on which the addressed information is located. Remaining bits one through twelve of the address 80 define a LSB field 82 which uniquely identifies which of the 4,096 address locations of each page is addressed.

Also shown in FIG. 2 is the sixteen bit offset data field 84. This data field 84 allows for offset accesses to up to 65,535 locations away from the preselected base address. Because the offset data field 84 extends beyond the LSB field 82 and partially overlaps the page field 81, it is possible to access a different page than the page accessed by the previous offset address access. The invention includes the discovery of the principle that, if the field of possible offsets cannot exceed the size of the LSB field 82, then at most one page can be crossed from the address stored in the base address register 18 (see FIG. 1). Extending this principle to all offset address accesses, the only information necessary to determine if the page accessed by the instruction currently in the interpret stage is on a different page can be obtained from an examination by the page displacement circuit 56 (see FIG. 1) of bits thirteen, fourteen, fifteen and sixteen and of the overlap between the page field 81 and the offset data field 84, and the carry from bit sixteen. The present inventive method implements the above principle using the circuit 56, and this method and circuit 56 can conclusive determine whether or not a translation hit to a currently known real address has occurred.

Referring to FIGS. 1 and 2, the page displacement circuit 56 includes a four bit adder 57. The adder 57 is connected by input lines 58 to the four lines of the bus 23 carrying the four most significant bits, bits thirteen through sixteen, of the offset information 84. The adder 57 is also connected by a line 59 to a carry output from bit 12 of the ALU 24. If the addition of the offset information 84 to the value stored in the base address register 18 results in a carry out of bit twelve of the ALU 24, then the adder 57 adds the carry out of bit twelve to the offset bit thirteen. Each of the remaining bit positions, bits fourteen through sixteen, of the adder 57 adds its respective input with the carry out of the immediately less significant bit position. The output of the adder 57, which consists of a four bit sum and a carry out of bit position sixteen, is connected by a five line bus 60 to a page displacement register 61, the operation of which is explained below.

The page displacement register 61 stores the the latest valid five bit page displacement supplied by the adder 57 via the bus 60. At the end of each interpret cycle of the three stage pipeline, the instruction decoder 20 has decoded the instruction which is currently in the interpret stage, and if, by inspecting the op code, the instruction decoder 20 determines that this instruction is an offset address access, then the five bit page displacement supplied via bus 60 is stored in the five bit page displacement register 61, replacing the previous valid page displacement stored there. The control of the storage into the page displacement register 61 is controlled by the instruction decoder 20 via a line 64 connected therebetween.

The page displacement register 61 outputs its five bit page displacement to a five bit input of a subtracter 68 via lines 65. A four bit input of the subtracter 68 is connected via lines 66 in parallel with the four bit input of adder 57. The output of the subtracter 68 is connected to five lines 69 which conduct a five-bit data difference from the subtracter 68 to one multi-input of the comparator 70. The carry bit out of bit position twelve of the ALU 24 is connected to a second input of the least significant bit position of the comparator 70 by a line 72, the second inputs of the four remaining multi-inputs to the most significant positions of the comparator 70 are all logical zeros. The output of the comparator 70 is then connected by line 71 to the instruction decoder 20.

Operation of the Preferred Embodiment

Initially, a control program of the processor 12 loads a preselected, thirty-two bit base address into the base address register 18 as a reference for future offset accesses to virtual addresses. At this point the real page address register 50 is empty, which means that the first offset address access cannot be a 'translation' hit. Thus for the first offset access, instruction decoder 20 enables the virtual address register 40 to retrieve, under the control of processor 12, the page that the offset addressed data is located on and store that page in a page of main memory. Further, as explained above, the corresponding real page address of this page is stored in the real page address register 50. At this point the offset register unit 10 is initialized and ready to 'translate' offset address accesses to their respective real address counterparts within the page accessed in the previous offset access.

The next offset address access is initiated by the processor 12 transmitting a sixteen bit offset address across bus 23 to the ALU 24, and the four most significant bits of the same offset address across the bus 58 to the page displacement circuit 56. At this point, the output of the base address register 18 has already been established by an earlier load thereto, and this output has also been asynchronously inputted to the ALU 24 via buses 26, 28. Thus, as soon as the offset is inputted via the bus 23 at the beginning of the interpret pipeline stage, the ALU 24 adds the offset with the least significant bit inputs from the bus 26, and adds any carries to the most significant bit positions with the most significant bit inputs from the bus 28. Since the ALU 24 is asynchronous, this sum is available before the end of the interpret stage. Thus, considerably before the end of the interpret stage the virtual address which corresponds to the combination of the offset and the base register address is temporarily stored in the virtual address output register 40. Similarly, considerably before the end of the interpret stage the twelve least significant bits from the output of the ALU 24 are concatenated with the twenty, page-address bits from the real page address register 50. The thirty-two bit concatenated address is then temporarily stored in the real address output register 44. These temporary or interim addresses have been prepared rapidly in parallel with other virtual memory 'translation' processes, and these temporary or interim addresses await validation by the results of the page displacement determination.

The page displacement determination is performed by the page displacement circuit 56. As previously mentioned, the circuit 56 has the four most significant bits of the offset conducted to its input. These four bits are added by the adder 57 to the carry out bit from the addition concurrently performed by the ALU 24. The output of the adder 57 is a temporary or interim page displacement value which indicates how many pages away the current, offset-addressed page is from the page stored in the base address register 18. If the present instruction in the interpret stage is determined by the instruction decoder 20 to be a valid offset address access to a virtual address at the end of the current interpret stage, then this temporary page displacement is stored in the page displacement register 61 as a finalized displacement value.

The page displacement stored in register 61 is important because if the present offset address access is located on the same page as the immediately previous offset address access, then a type of 'translation' hit has occurred. In this case a 'translation' hit means that the information on the page of interest has already been translated into real memory and can be accessed directly. The page displacement circuit 56 determines if a 'translation' hit has occurred by subtracting the four most significant bits of the offset, i.e. the overlap bits, from the previous page displacement. The result of that subtraction is compared to the carry out of bit twelve of the ALU 24. If these two values are equal, then a 'translation' hit has occurred. Conversely, if the two values are not equal, then a 'translation' miss has occurred. Thus, the line 71 either indicates a 'translation' hit or miss.

The output of the comparator 70 is connected to an input of the instruction decoder 20 by line 71. A second input of the instruction decoder is connected to the data and instruction bus 14. By decoding the input from the data and instruction bus 14, the instruction decoder 20 can determine if the instruction currently in the interpret stage of the pipeline is a valid instruction for a virtual memory offset address access. If the current instruction is a valid virtual memory offset address access instruction, then at the end of the interpret stage the instruction decoder 20 controls the storage of the new page displacement into the page displacement register 61, and finalizes the values stored in the virtual address output register 40 and in the real address output register 44. By decoding the value out of the comparator 70, the instruction decoder 20 determines whether a 'translation' hit has occurred and enables the address output of the real address output register 44, or a 'translation' miss has occurred, in which case the decoder 20 enables the address output of the virtual address output register 40. Thus, with a relatively small amount of circuitry, the offset is added to the preselected base address, the address is decoded to see if a valid virtual address access is in process, and a translation to a real address, if one is necessary, is performed during the interpret stage without delaying the progress of the pipelined processor 12. It can be appreciated that if a sufficiently fast processor 12 were used, then the processor 12 could also perform the functions of the instruction decoder 20, thereby making the decoder 20 unnecessary.

Thus, it will now be understood that there has been disclosed a new and novel method and apparatus for offset register address accessing which provides offset address calculations and virtual memory translations in parallel with other operations during the interpret stage of a pipeline data processing system. While the invention has been particularly illustrated and described with reference to a preferred embodiment thereof, it will be understood by those skilled in the art that various changes in form, details, and applications may be made therein. Such as varying the length of the page field, offset field, and the overlap, or using a number of offset register units in parallel to broaden the base address coverage. A further application of this invention would be as the cache-hit or cache-miss indicator and the cache address translator for a cache memory system. It is accordingly intended that the appended claims shall cover all such changes in form, details and applications which do not depart from the true spirit and scope of the invention.

What is claimed as new and desired to be secured by Letters Patent of the United States is:

1. An apparatus for use with a data processor which fetches and executes instructions for addressing a memory address location using a variable offset from a preselected memory address, comprising:

register means, connected to the data processor for storing a preselected memory address;

means, connected to the data processor for transferring an offset value from an offset data field of a most recently fetched instruction;

means for adding said offset value to said preselected memory address and outputting an interim memory address;

means for determining if said most recently fetched instruction is an offset memory access instruction; and means for either finalizing said interim memory address into a final memory address if said most recently fetched instruction is an offset memory access instruction or invalidating said interim memory address if said most recently fetched instruction is not an offset memory access instruction;

wherein said finalizing or invalidating means includes:

a second register having a page displacement value representing a displacement of an immediately previous offset memory access instruction stored therein;

means for subtracting at least one overlap bit of said offset value from said page displacement value;

means for comparing an output of said subtracting means with a carry-out bit of said adding means thereby determining if the most recently fetched instruction is located on the same page as the immediately previous offset memory access; and means for outputting the final memory address to a memory storage device for fetching data stored at the final memory address location.

2. The apparatus for use with a data processor which fetches and executes instructions for addressing a memory address location using a variable offset from a preselected memory address as set forth in claim 1, wherein said outputting means is a virtual address output register and said memory storage device is a virtual address storage device.

3. The apparatus for use with a data processor which fetches and executes instructions for addressing a memory address location using a variable offset from a preselected memory address as set forth in claim 1, wherein said outputting means is a real address output register and said memory storage device is a main memory.

4. An apparatus for use in a pipeline data processing system for addressing a memory address location using an offset from a base memory address, comprising:

means for storing the base memory address into a first register;

means for storing a real page address register into a second register;

means for adding the offset and the base memory address to generate an interim virtual memory address and a portion of an interim real memory address;

means for concatenating a second portion of the interim real memory address stored in the real page address register with the first portion of the interim real memory address to form the interim real address;

means for determining if a real address location corresponding to said interim real memory address exists in the pipeline data processing system;

means for deciding during an interpretation stage of the pipeline data processing system if a currently fetched instruction is an offset memory access instruction;

said determining means includes means for storing a page displacement of a memory page accessed by the previous offset access instruction, means for subtracting at least one overlap bit from the offset portion of the offset access instruction from a value stored in the page displacement register, and comparator means for comparing an output of said subtracting means with a carry bit output from said adder means which is the carry bit generated out of said first real memory address portion when said said offset and said preselected base memory address are added together;

means responsive to the determining means and the deciding means for storing a final real address if the currently fetched instruction is an offset memory access instruction and if the real address location corresponding to the interim real memory address does exist;

means responsive to the determining means and the deciding means for storing a final virtual address if the currently fetched instruction is an offset memory access instruction and if the real address location corresponding to the interim real memory address does not exist; and means for accessing data stored in the final address location.

5. An apparatus for accessing a memory address location using an offset access instruction and a base memory address, comprising:

a base address register for storing the base memory address;

an input bus for transferring an offset portion and a page portion of the offset access instruction;

a first adder connected to the input bus for adding the offset portion of the offset access instruction to the base memory address and generating an interim memory address thereby;

a decoder connected to the input bus for determining if the offset access instruction is valid;

means for finalizing said interim memory address into a final memory address if the offset access instruction is valid:

a second adder for adding an overlap portion of said offset portion to a carry bit out of an addition of said offset with a least significant portion of said base memory address in said first adder to generate an interim page displacement;

means for finalizing each interim page displacement to a respective final page displacement and storing each subsequent final page displacement;

means for subtracting at least one overlap bit from the offset portion of the current offset access instruction from a previous page displacement stored in said finalizing and storing means; and comparator means for comparing an output of said subtracting means with a carry bit output from said first adder which is the carry bit generated out of said first real memory address portion when said said offset and said base memory address are added together to determine if the address location corresponding to said current offset access instruction currently exists in a real memory address location.

6. In a data processor which fetches and executes instructions a method for addressing memory address locations using variable offsets from fixed memory address locations, comprising the steps of:

preloading a fixed memory address into a first register;

transferring an offset value from an offset data field of a most recently fetched instruction;

adding said offset value to said fixed memory address and generating an interim memory address of said addition;

determining if said most recently fetched instruction is an offset memory access instruction;

finalizing said interim memory address into a final memory address if said most recently fetched instruction is an offset memory instruction;

storing a page displacement value into a second register; and subtracting at least one overlap bit of said offset value from the page displacement value stored in the second register.

7. In a data processor which fetches and executes instructions the method for addressing memory address locations using variable offsets from fixed memory address locations set forth in claim 6, further comprising the steps of:

comparing the result of the subtracting step with a carry out of a least significant portion of said fixed memory address location during said adding of said offset with said fixed memory address;

fetching data from a real memory address location corresponding to said offset value if the result of the comparing step is an equality; and fetching data from a virtual memory address location corresponding to said offset value if the result of the comparing step is not an equality.

* * * * *